(12) United States Patent
Irwan et al.

(10) Patent No.: US 10,270,770 B1
(45) Date of Patent: Apr. 23, 2019

(54) GENERIC COMPUTING DEVICE ATTESTATION AND ENROLLMENT

(71) Applicant: XAGE SECURITY, INC., Palo Alto, CA (US)

(72) Inventors: Susanto Junaidi Irwan, San Francisco, CA (US); Roman M. Arutyunov, San Jose, CA (US); Ganesh B. Jampani, Gilroy, CA (US); Andy Sugiarto, Moraga, CA (US)

(73) Assignee: Xage Security, Inc., Palo Alto, CA (US)

( * ) Notice: Subject to any disclaimer, the term of this patent is extended or adjusted under 35 U.S.C. 154(b) by 0 days.

(21) Appl. No.: 16/110,567

(22) Filed: Aug. 23, 2018

(51) Int. Cl.
| | |
|---|---|
| *H04L 29/06* | (2006.01) |
| *H04L 9/06* | (2006.01) |
| *H04L 9/08* | (2006.01) |
| *H04L 9/32* | (2006.01) |

(52) U.S. Cl.
CPC ........ *H04L 63/0876* (2013.01); *H04L 9/0637* (2013.01); *H04L 9/085* (2013.01); *H04L 9/3271* (2013.01)

(58) Field of Classification Search
CPC .................................................. H04L 63/0876
USPC .......................................................... 726/6
See application file for complete search history.

(56) References Cited

U.S. PATENT DOCUMENTS

| | | | | |
|---|---|---|---|---|
| 10,057,243 B1* | 2/2018 | Kumar | ..................... | G06F 21/85 380/52 |
| 2018/0183587 A1* | 6/2018 | Won | ..................... | H04L 9/0637 713/151 |
| 2018/0254905 A1* | 9/2018 | Chun | ..................... | H04L 9/3236 713/168 |

* cited by examiner

*Primary Examiner* — Longbit Chai
(74) *Attorney, Agent, or Firm* — Hickman Palermo Becker Bingham LLP

(57) ABSTRACT

Secure enrollment of devices into computer networks is improved by a method that comprises receiving a first set of security data for computing devices from a vendor computing device and a second set of security data from a partner computing device and storing the first and second set of security data in a data repository; issuing a first authentication challenge to the computing devices, wherein the challenge is based on the first set and the second set of device security data; receiving a first authentication response from the computing devices and cross-referencing the first authentication response with the first set and the second set of device security data; receiving a second authentication challenge from the computing devices, wherein the second authentication challenge is based on the first set of security data; and issuing a second authentication response to the computing devices and determining whether to enroll the computing devices.

20 Claims, 9 Drawing Sheets

GENERIC COMPUTING DEVICE ATTESTATION AND ENROLLMENT

TECHNICAL FIELD

One technical field of the present disclosure relates to improved methods, systems, computer software, and/or computer hardware in the field of data security. The disclosure relates more specifically to improved computer-implemented methods and systems for providing generic device attestation and enrollment using a distributed architecture and distributed database. Certain embodiments are useful in providing enrollment and access control services for internet of things (IoT) devices and improving the resistance of networked IoT devices to attacks, unauthorized or malicious use, or malware.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The development and deployment of internet of things (IoT) devices has proceeded with remarkable speed in the past several years. IoT devices are diverse, including everything from controllers of industrial equipment to smart watches and personal activity monitors. However, security infrastructure has not kept pace with the huge number and wide use of these devices. Some analysts estimate that billions of such devices will be operating and connected to internetworks within a few years, but there is presently no effective security architecture that can efficiently permit IoT devices to be secured, yet readily usable. Key constraints in this technical field have included limited processing power, limited memory, limited or absent user interface elements, and limited and intermittent network connectivity. All these characteristics of IoT devices make them difficult to integrate into existing client-server security systems. At the same time, misuse of IoT devices could be catastrophic by permitting an attacker or unauthorized user to gain control of industrial equipment or other systems that have embedded IoT devices.

Industrial and commercial operators are currently deploying millions of IoT devices in various enterprise environments. Pre-configuring millions of IoT devices with security information is difficult to scale and places an enormous processing burden on the operators. However, establishing trust with IoT devices in an enterprise environment during deployment without pre-configuring security information is difficult. In previous approaches, operators have shifted the processing burden of pre-configuration onto manufacturers or vendors that perform pre-configuration services.

Thus, there is a need for decreasing processing burdens of manufacturers and decreasing deployment processing burdens through a generic device attestation and enrollment process. There is also a need for increased data security throughout the attestation and enrollment process for these generic devices. There is also a need for a secure method of storing and accessing security service information that is tolerant of security breaches.

SUMMARY

The appended claims may serve as a summary of the invention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
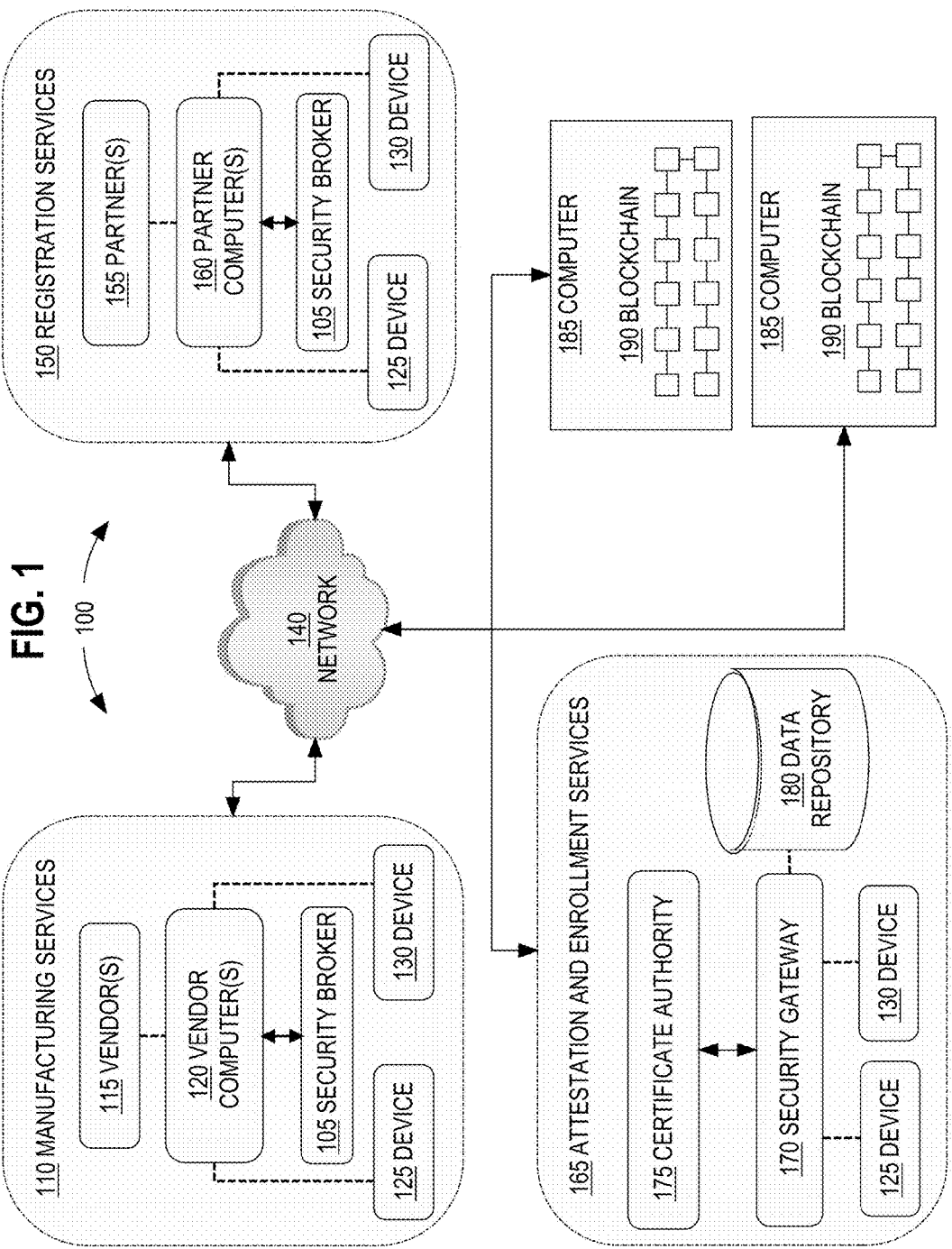
FIG. 1 illustrates a networked computer system, in an example embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:

1.0 GENERAL OVERVIEW
2.0 STRUCTURAL OVERVIEW
   2.1 MANUFACTURING AND REGISTRATION SERVICES
   2.2 BLOCKCHAIN ARCHITECTURE
   2.3 ATTESTATION AND ENROLLMENT SERVICES
3.0 FUNCTIONAL OVERVIEW
   3.1 SECURITY BROKER
   3.2 SECURITY GATEWAY
   3.3 BLOCKCHAIN OPERATIONS
4.0 PROCEDURAL OVERVIEW
5.0 HARDWARE OVERVIEW 1.0 General Overview According to various embodiments, methods and systems are provided that enable improved computer processing efficiency and data security. Specifically, the present approach enables manufacturing of generic devices without the need for resource-intensive pre-configuration of customer-specific security information. Instead of pre-configuring devices with security information, a security gateway is configured to perform mutual attestation and enrollment of generic devices prior to and/or during deployment of those devices by using registration information obtained during a manufacturing, registration, and/or deployment process. The distributed system obtains this registration or security service data using a security broker and utilizes a distributed blockchain database to store registration data, thereby using a consensus network for increased data security. This approach has the benefit of decreasing excessive use of manufacturer processing resources while increasing resistance against malicious attacks on sensitive data.

In an embodiment, a networked computer system comprises a security broker for manufacturing and registration services, a security gateway for attestation and enrollment services, and a distributed blockchain system. The security broker may be software, hardware, or a combination thereof that detects changes to security service data, encrypts and distributes the data in shares, and updates blockchain data with the distributed encrypted shares. The security gateway may be software, hardware, or a combination thereof that detects changes to the blockchain data, updates a local data repository with the security service data, and performs attestation and enrollment services for devices prior to device deployment. The blockchain system is a distributed database storing linked blocks of data in multiple computing devices.

In an embodiment, a computer-implemented method comprises, when an attestation timing has not been met, receiving a first set of security service data for one or more computing devices from a vendor computing device and a second set of security service data for the one or more computing devices from a partner computing device, and storing the first set and the second set of security service data as part of one or more computing device records in a data repository. The method further comprises, when the attestation timing has been met, issuing a first authentication challenge to the one or more computing devices, wherein the first authentication challenge is based on the first set and the second set of device security service data that is stored in the data repository. The method further comprises, in response to issuing the first authentication challenge, receiving a first authentication response from the one or more computing devices and cross-referencing the first authentication response with the first set and the second set of device security service data. The method further comprises, when the attestation timing has been met, receiving a second authentication challenge from the one or more computing devices, wherein the second authentication challenge is based on the first set of security service data that is stored in the data repository. The method further comprises, in response to receiving the second authentication challenge, issuing a second authentication response to the one or more computing devices, and in response to receiving the first authentication response and issuing the second authentication response, determining whether to enroll the one or more computing devices.

In another embodiment, a computer system providing an improvement in computer processing and data security comprises a distributed blockchain data repository, a broker computing device, and a gateway computing device. The broker computing device is communicatively coupled to the distributed blockchain data repository and comprises a first non-transitory data storage medium storing a first set of instructions which, when executed by the broker computing device, cause: when an attestation timing has not been met, receiving a first set of security service data for one or more Internet of Things (IoT) devices from a vendor computing device and a second set of security service data for the one or more IoT devices from a partner computing device, and storing the first set and the second set of security service data as part of one or more IoT device records in the distributed blockchain data repository. The gateway computing device is communicatively coupled to the distributed blockchain data repository and comprises a second non-transitory data storage medium storing a second set of instructions which, when executed by the gateway computing device, cause: when the attestation timing has been met, issuing a first authentication challenge to the one or more IoT devices, wherein the first authentication challenge is based on the first set and the second set of device security service data that is stored in the distributed blockchain data repository. The second set of instruction further cause, in response to issuing the first authentication challenge, receiving a first authentication response from the one or more IoT devices and cross-referencing the first authentication response with the first set and the second set of device security service data. The second set of instruction further cause, when the attestation timing has been met, receiving a second authentication challenge from the one or more IoT devices, wherein the second authentication challenge is based on the first set of security service data that is stored in the distributed blockchain data repository. The second set of instruction further cause, in response to receiving the second authentication challenge, issuing a second authentication response to the one or more IoT devices. The second set of instruction further cause, in response to receiving the first authentication response and issuing the second authentication response, determining whether to enroll the one or more computing devices.

2.0 Structural Overview

FIG. 1 illustrates a networked computer system in an example embodiment.

In an embodiment, a computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" may be one or more physical computers, virtual computers, and/or computing devices. As an example, a computer may be one or more server computers, cloud-based computers, cloud-based cluster of computers, docker containers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C or any other suitable programming environment.

FIG. 1 illustrates only one of many possible arrangements of components configured to execute the programming described herein. Other arrangements may include fewer or different components, and the division of work between the components may vary depending on the arrangement. In the example of FIG. 1, a networked computer system 100 may facilitate the secure exchange of data between programmed computing devices providing manufacturing services 110, devices providing registration services 150, devices providing attestation and enrollment services 165, and devices of a blockchain 190. Therefore, various elements of 110, 150, 165, and 190 of FIG. 1 may each represent one or more computers that host or execute stored programs that provide the functions and operations that are described further herein in connection with manufacturing services, registration services, attestation and enrollment services, and blockchain operations. "Attestation," in this context, refers to methods used for confirming a device's identity; an enrollment list may instruct a provisioning service which method of attestation to use with a given device. Past methods of attestation have included validation of X.509 certificates, or using a Trusted Platform Module (TPM) based on a nonce challenge to present a signed Shared Access Signature (SAS) token. The methods and systems describe herein may be designed to accommodate a variety of different manufacturers, vendors, and partners, allowing for a vendor- and hardware-agnostic approach.

2.1 Manufacturing and Registration Services

Manufacturing services 110 may be services that are programmatically offered to manufacturer(s) or vendor(s) 115, including the brokering of data that is generated during the manufacturing or programming of device 125, 130 and/or device components. Registration services 150 may be services that are programmatically offered to partners 155, including the brokering of data that is generated during a registration of device ownership prior to delivery of the device 125, 130 to specific owners or customers. Typically, manufacturing services 110 are delivered by executing stored computing instructions through a security broker 105 in conjunction with vendor computer(s) 120. Similarly, registration services 150 are delivered by executing stored computing instructions through a security broker 105 in conjunction with partner computers 160.

In past approaches, vendors 115 would pre-configure devices with customer-specific security profiles during the manufacturing phase, resulting in extra processing burden on the vendors 115. The current approach shifts the processing burden away from vendors and towards a dedicated attestation and enrollment system such that vendors may produce generic devices without specific customer security information.

In this current approach, vendor computer 120 may be a computer, a virtual computer, and/or a computing device. As an example, a computer may be one or more server computers, cloud-based computers, cloud-based cluster of computers, docker containers, virtual machine instances or virtual machine computing elements such as virtual processors, storage and memory, data centers, storage devices, desktop computers, laptop computers, mobile devices, and/or any other special-purpose computing devices.

Partner computer 160 may be a computer, a virtual computer, and/or a computing device. As an example, a computer may be one or more server computers, cloud-based computers, cloud-based cluster of computers, docker containers, virtual machine instances or virtual machine computing elements such as virtual processors, storage and memory, data centers, storage devices, desktop computers, laptop computers, mobile devices, and/or any other special-purpose computing devices.

Device 125, 130 may be a computer, a virtual computer, and/or a computing device. As an example, a computer may be one or more server computers, cloud-based computers, cloud-based cluster of computers, docker containers, virtual machine instances or virtual machine computing elements such as virtual processors, storage and memory, data centers, storage devices, desktop computers, laptop computers, mobile devices, and/or any other special-purpose computing devices. Specifically, device 125, 130 may be IoT devices, which are physical devices with network connectivity capabilities that enables these physical devices to collect and exchange data. In an embodiment, the IoT devices may be industrial IoT meters, sensors, controllers, cameras, or any other industrial IoT device. The device 125, 130 may also be specific users using the device, or an application running on the device.

A security broker 105 may be a computer, software and/or hardware or a combination storing instructions that are programmed or configured to coordinate with vendor computers 115 to access security service data related to device 125, 130 and securely transfer the security service data. In an embodiment, the security broker 130 may generate secret shares of security service data, hash and encrypt the security service data, and send the information over a network 140 to a blockchain 190, as further described herein.

Network 140 broadly represents a combination of one or more wireless or wired networks, such as local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 140 and the disclosure presumes that all elements of FIG. 1 are communicatively coupled via network 140. The various elements depicted in FIG. 1 may also communicate with each other via direct communications links that are not depicted in FIG. 1 for purposes of explanation.

While each of the components listed above is illustrated as if located on a single computer, one or more of the components listed above may be part of and/or executed on different computers.

2.2 Blockchain Architecture

The blockchain 190 may comprise blocks of linked data that are stored in an interconnected network of computers, with suitable stored programs at those computers to support ordered creation and transmission of blockchain data. Blockchain 190 forms a distributed database that maintains a continuously growing list of ordered records termed blocks that are timestamped and linked to a previous block. Each block in the series of blocks is linked together chronologically, with each new block containing a hash of the previous block. Each computer 185, or node, in a network of computers may store the entire record of linked data blocks. This creates a consensus network of computers that can verify the integrity of each block of data and the integrity of the entire blockchain 190. The consensus network has the benefit of having a high Byzantine fault tolerance, which is the ability of a computing system to tolerate Byzantine failures. As a result, the blockchain 190 functions as a distributed database that ensures the integrity of the data by utilizing hash functions to link each block to its previous block and storing the entire record of data blocks at each node.

2.3 Attestation and Enrollment Services

Attestation and enrollment services 165 may be services that are programmatically offered to owners or customers of a device 125, 130 prior to deployment of the devices. These attestation and enrollment services 165 may include authentication of a device 125, 130 by a security gateway 170, authentication of the security gateway 170 by the device 125, 130, and enrollment of the device 125, 130 into the customer trust or private or public certificate authority 175.

A security gateway 170 may be a computer, software and/or hardware or a combination storing instructions configured to work in conjunction with other security gateways 170 to access security service data stored in the blockchain 190, encrypt and/or decrypt secret shares, and perform mutual authentication of devices 125, 130 for device enrollment and deployment based on the security service data. In an embodiment, security service data that is stored in the blockchain 190 may be also be transferred and stored in a local data repository 180 associated with the security gateway 170.

3.0 Functional Overview

In an embodiment, the security broker 105, blockchain 190, and security gateway 170 interoperate programmatically in an unconventional manner to provide a virtual security intermediary between the manufacturers, distributers, and customers. In an embodiment, security gateway 170 is programmed to provide mutual authentication services using data stored in the blockchain 190 and/or a local data repository 180. The security broker 105 and blockchain 190 are programmed or configured to copy, encrypt, distribute, store, and transport sensitive security information in a secure manner so that the security gateway 170 may perform attestation and enrollment services 165 using the security information, as further described in other sections herein.

3.1 Security Broker

Figure 2:
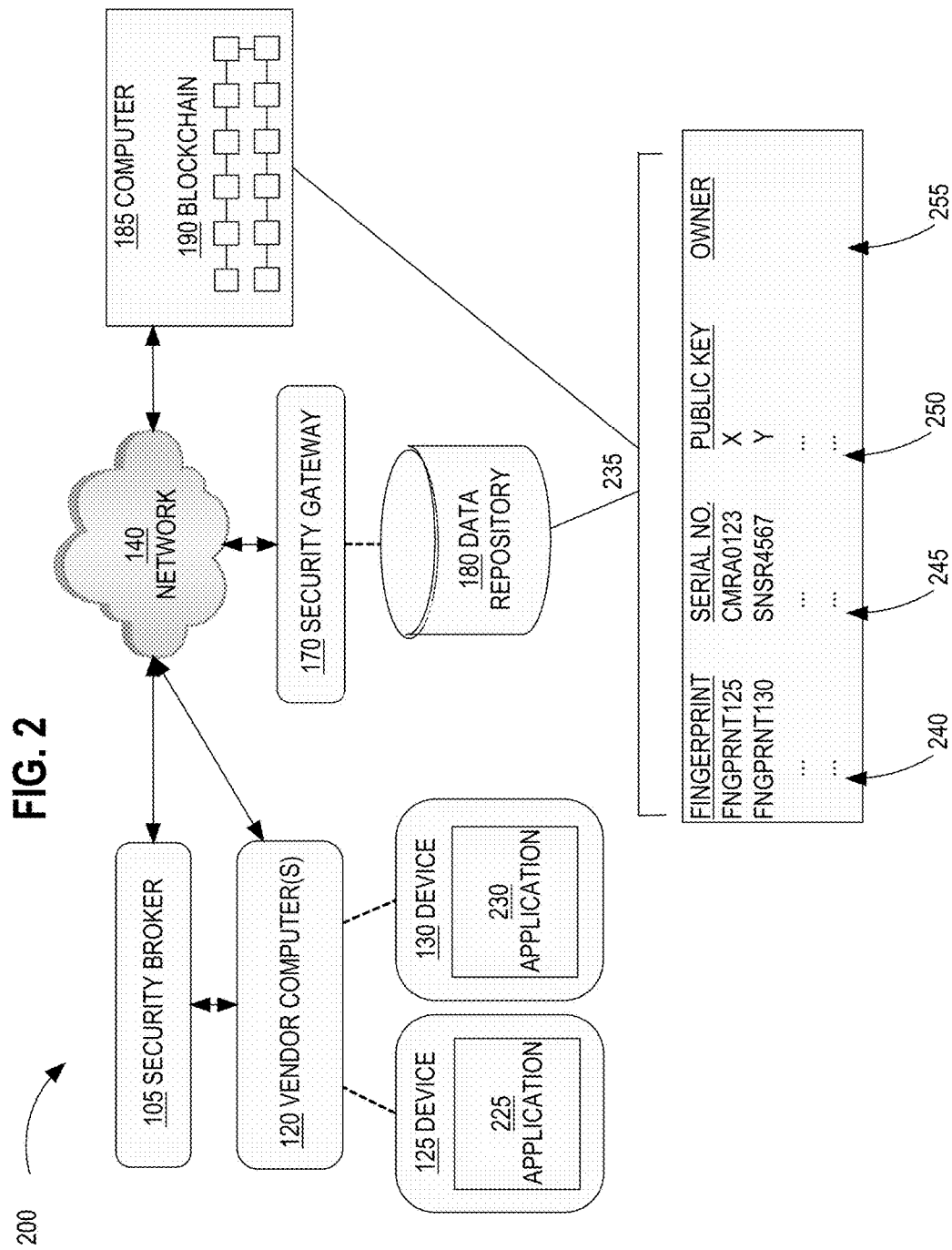
FIG. 2 illustrates a networked computer system where security service data is generated by vendor computers and stored in a blockchain data repository, in an example embodiment.

FIG. 2 illustrates a networked computer system 200 where security service data for device 125, 130 is generated by vendor computers 120 and stored in a blockchain 190 data repository using a security broker 105, in an example embodiment.

At the manufacturing stage, any number of vendors 115 may manufacture any number of hardware components and/or software components that are assembled to create the completed device 125, 130. Each completed device 125, 130 may be configured to run an application 225, 230. While the techniques herein are described with relation to the device 125, 130, the techniques may be applied to attest and enroll the device 125, 130, the application 225, 230, or any combination thereof.

During manufacturing stage, security service data related to various devices 125, 130 may be generated and stored. Optionally, when a device 125, 130 is manufactured, the vendor 115 may use the vendor computer 120 to embed a gateway public key into each device 125, 130. Vendor device-specific keys that are used to obtain vendor-specific certificates are also generated on the device 125, 130 or injected. In an embodiment, vendor-specific certificates for each vendor in the manufacturing process may be obtained by each device 125, 130.

The security service data may also include a unique device fingerprint. The device fingerprint may be dynamically generated upon boot-up of the device 120, 130 without storing the fingerprint in a local device data repository. Specifically, the device fingerprint may be dynamically generated using multiple parameters, such as Central Processing Unit (CPU) data, memory data, a Media Access Control (MAC) address, a BIOS checksum, a hard drive serial number, a seed embedded in the code, a time of manufacture, firmware data or a hash of the firmware data, and/or any other parameters.

In an embodiment, a signed device serial number that is encrypted and stored as a shared secret may also be generated as part of the security service data. Specifically, a signed device serial number is assigned to a device 125, 130 by a vendor computer 120. The security broker 105 may access the device serial number from the vendor computer and hide the security service data. For example, the security broker 105 may use a secret sharing algorithm to generate numerous shares of the security service data. Each share may then be encrypted using public keys of a number of security gateways 170 to generate numerous encrypted shares. In an embodiment, nine total shares may be generated using nine public keys of nine security gateways 170. In an embodiment, two of the nine total shares may be the sufficient number of shares needed to reveal the shared secret.

A local security broker 105 may then update blockchain 190 by creating new data entries of the encrypted shares of the serial number, the device fingerprint, gateway public key, vendor-specific keys, and any other security service data associated with the specific devices 125, 130, in the blockchain 190. For example, the blockchain 190 may store specific device records featuring security service data 235 that lists the device fingerprint 240, the serial number 245 as a shared secret, and the gateway public key 250. While the example of FIG. 2 illustrates specific types of security service data, any number of different types of security service data may be stored. In an embodiment, the device record may have a device ownership 255 category of the security service data for storing ownership information. However, the ownership 255 category of FIG. 2 does not feature values because the device ownership is not assigned at the manufacturing stage. Once the manufacturing stage has been completed, a device 125, 130 is sent to a partner 155 entity where the device 125, 130 may be assigned an owner.

Figure 3:
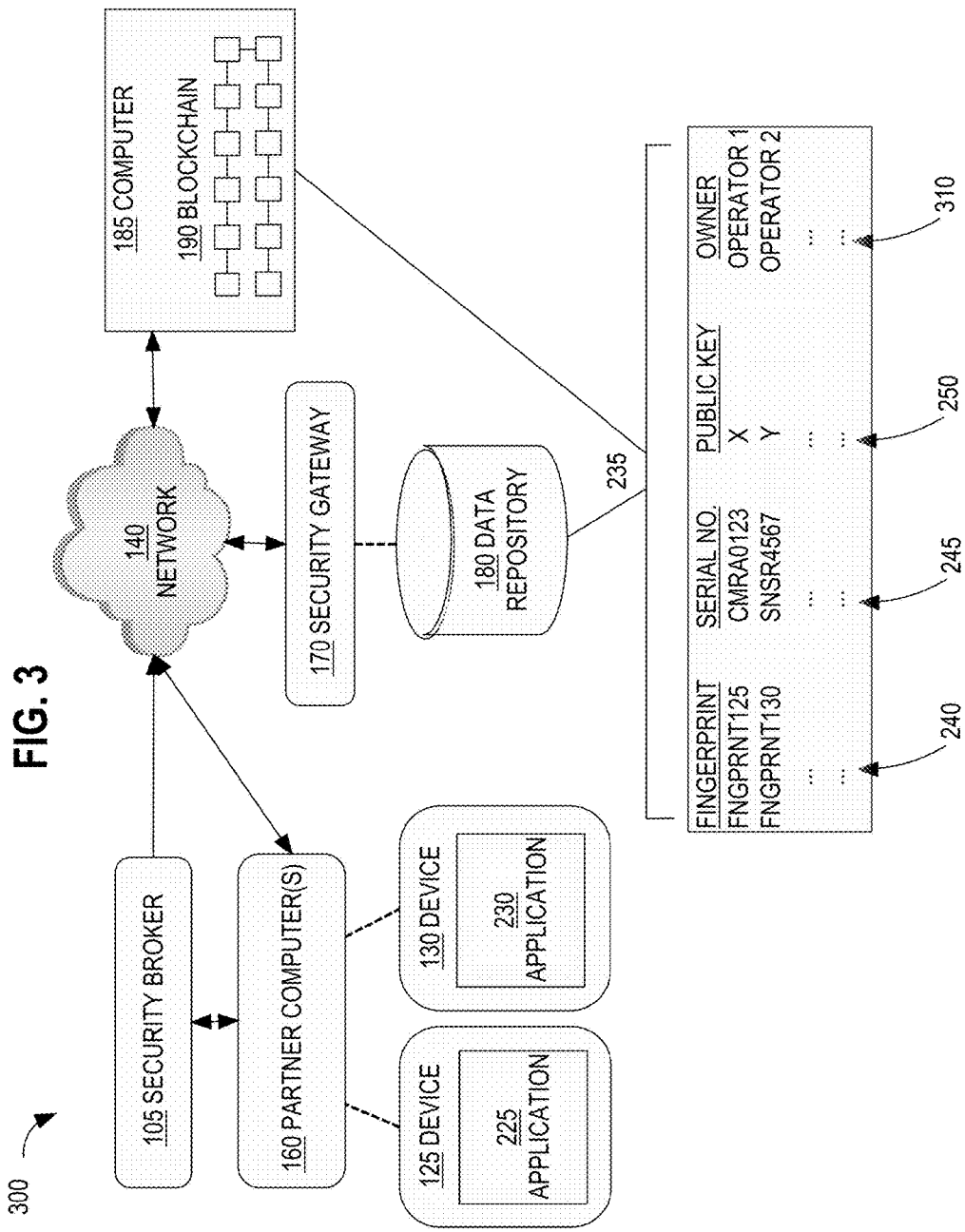
FIG. 3 illustrates a networked computer system where security service data is generated by partner computers and stored in a blockchain data repository, in an example embodiment.

FIG. 3 illustrates a networked computer system 300 where security service data 235 is generated by partner computers 160 and stored in a blockchain 190 data repository using a security broker 105, in an example embodiment.

Once manufactured, the devices 125, 130 are sent to a partner 155 entity for sales, distribution, and/or delivery to a customer or owner. Once the partner 155 determines the identity of the final owner of a particular device 125, 130, the partner 155 may use a partner computer 160 to register ownership information as part of the security service data for the device 125, 130. A local security broker 105 may then update the device record data stored in the blockchain 190 with the new ownership information 310. For example, the blockchain 190 may subsequently store specific device records featuring security service data 235 that lists the device fingerprint 240, the serial number 245 as a shared secret, gateway public key 250, and ownership information 310.

Figure 4:
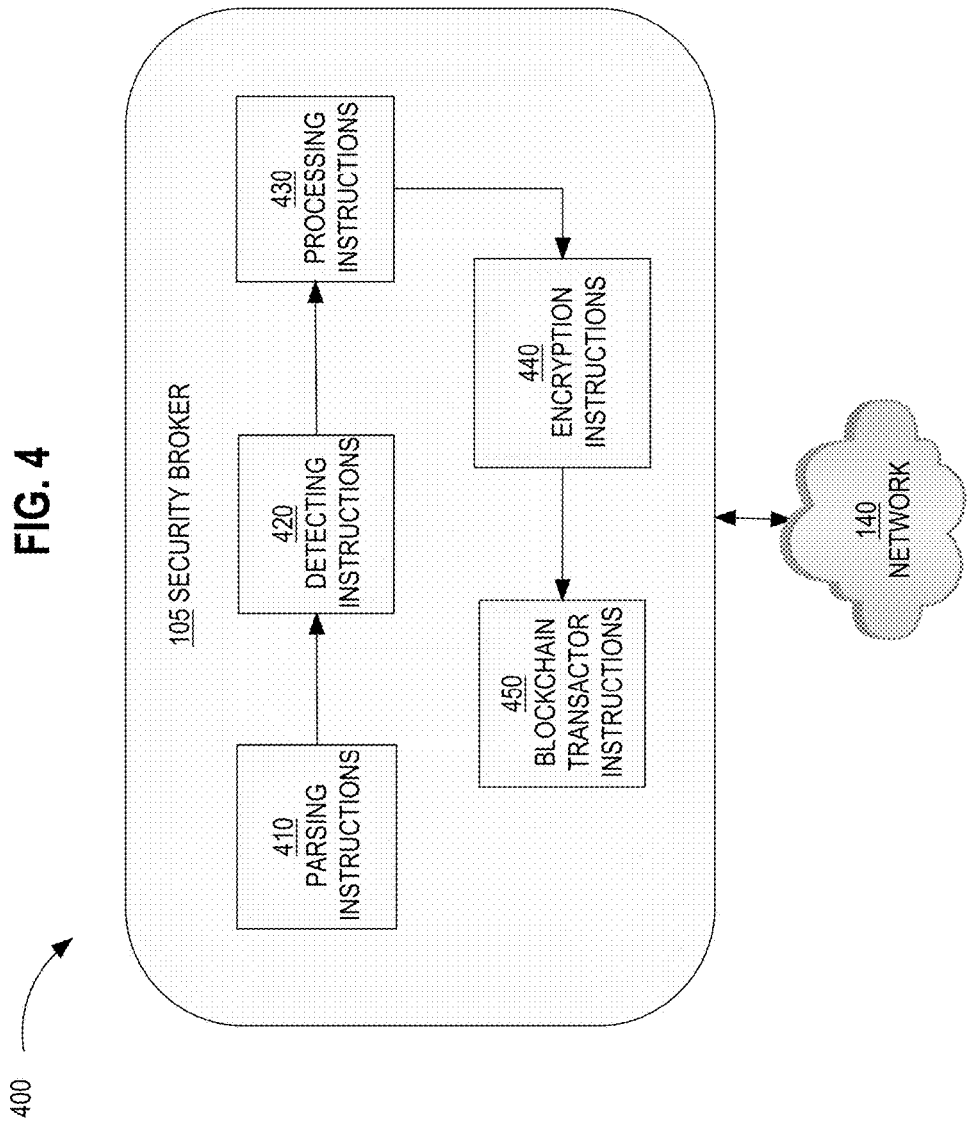
FIG. 4 illustrates a security broker, in an example embodiment.

FIG. 4 illustrates a security broker 105, in an example embodiment. In an embodiment, reference numeral 400 indicates a computer system comprising a security broker 105 coupled to a data network 140. Security broker 105 may be a computer, software and/or hardware or a combination storing instructions and/or databases that act to protect, store, distribute, encrypt, and transfer security service data associated with one or more devices 125, 130. Each vendor 115 and/or partner 155 may have a security broker 105 running locally within their network in order to provide these distribution and encryption services.

Specifically, security broker 105 may contain parsing instructions 410 which access device security service information that is stored locally. For example, security service information may be stored in local data repositories associated with vendor computers 120 and partner computers 160. The parsing instructions 410 may parse the security service information to generate a reorganized list of security service information for organizational purposes. The reorganized list may be a list of cleartext or hashed device serial numbers, vendor-specific public keys, ownership information, or any other security service data. The frequency at which the security broker 105 accesses and parses the security service information may be determined by the vendor 115 or partner 155. The frequency may be in seconds, minutes, hours, days, weeks, or any other increment of time. The frequency may also be based on Internet connectivity availability, demand, or any other factor.

The security broker 105 is programmed to detect changes to the security service information since the previous check. Specifically, the security broker 105 may contain detecting instructions 420 which compare the current hash with a hash from a previous detection. When security service information is stored, a hash function may be applied to the security service information. For example, a hash function, such as an MD5, Secure Hash Algorithm (SHA), or any other hash function may map the security service data to a hash, or index, such as an MD5 hash, SHA hash, or any other hash value. The hash may act as a numerical representation of the security service data. Any hash function, as understood in the art, may be used. Any changes to the security service information would change the hash, thereby creating differences in the current hash compared to the hash from a previous detection.

If the hash has not changed, then the security broker 105 is programmed to return to parsing. However, if the hash has changed, then the processing instructions 430 may extract the security service information from any local data repositories. In an embodiment, the security broker 105 may also hide certain types of security service information, such as device serial numbers, using a secret sharing algorithm. The processing instructions 430 may generate numerous shares of the security service information. The number of shares may be equivalent to a total number of security gateways 170, in an example embodiment. The shares may then be encrypted by encrypting instructions 440, using the public keys of various participating security gateways 170 to generate numerous encrypted shares.

Blockchain transactor instructions 450, associated with the security broker 105, may identify the security service data, including any encrypted secret shares, and update blockchain 190 by creating new data entries of the security service data in the blockchain 190. The encrypted security service information is sent to the blockchain 190 through the network 140.

3.2 Security Gateway

Figure 5:
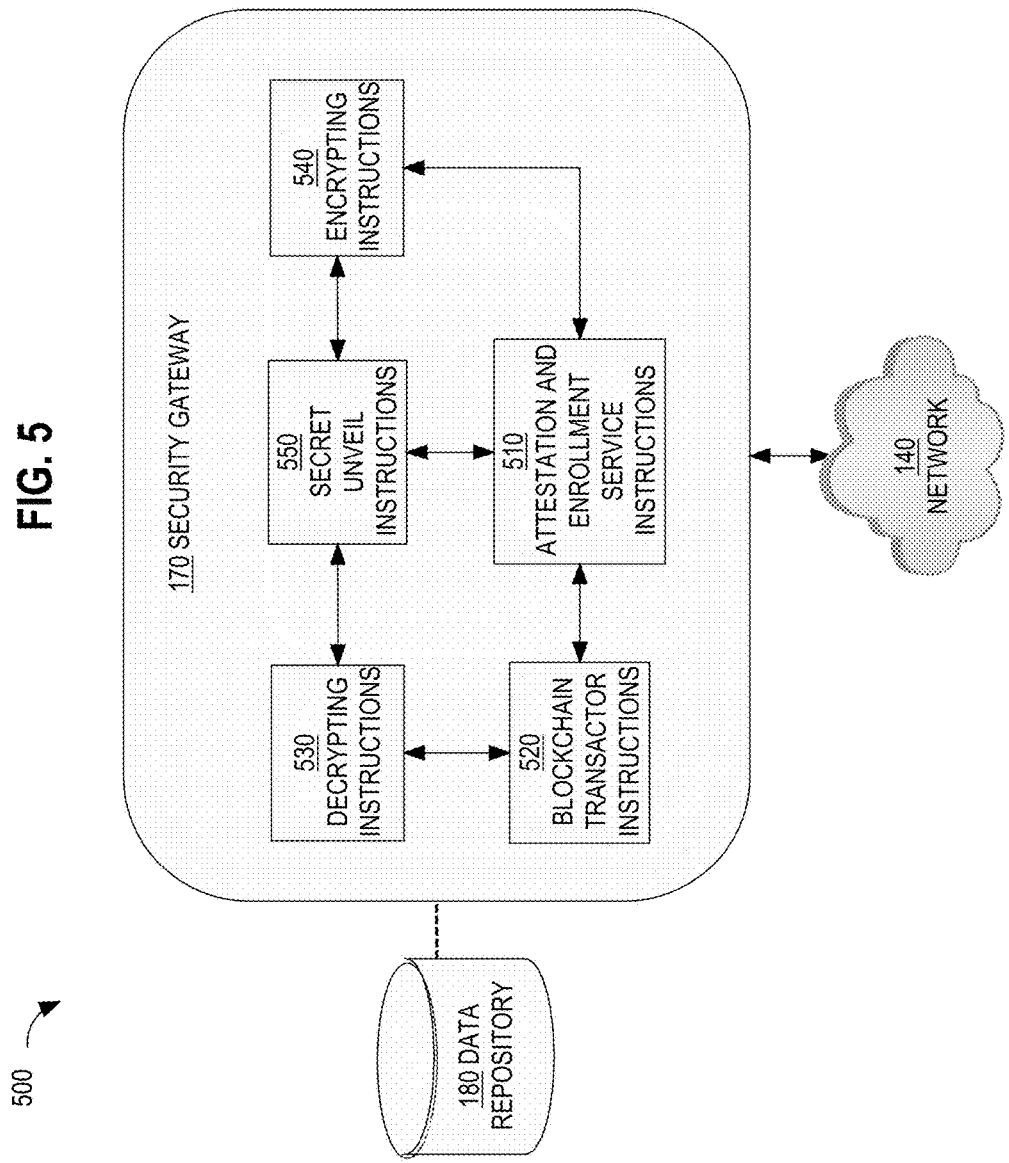
FIG. 5 illustrates a security gateway, in an example embodiment.

FIG. 5 illustrates a security gateway, in an example embodiment. In an embodiment, reference numeral 500 indicates a computer system comprises a gateway 170 coupled to a data network 140. In an embodiment, the security gateway 170 may be deployed at the customer or owner premise. Security gateway 170 may be a computer, software and/or hardware or a combination storing instructions and/or databases that access, encrypt, decrypt, and utilize security service data for authentication and enrollment services. Specifically, the security gateway 170 may connect to the blockchain 190 through the network 140 and work in conjunction with other security gateways 170 to access the security service data and perform authentication and enrollment services.

The security gateway 170 may comprise programmed instructions that implement an Application Program Interface (API) that defines program functions that a device 125, 130 or application 225, 230 may call to connect to the security gateway 170. The API may be, for example, a representational state transfer (REST) API integrated with an HTTP server so that RESTful API calls can be issued in parameterized URLs over HTTP, Constrained Application Protocol (CoAP), or any other protocol from the device 125, 130 to the API.

In one embodiment, a device 125, 130 connected to the security gateway 170 through the API may be validated using the attestation and enrollment service instructions 510. The attestation and enrollment service instructions 510 may perform authentication services for devices 125, 130 prior to device deployment using the security service data that is stored as data in blockchain 190, in part by working in conjunction with other security gateways 170 to decrypt and reveal the shared secret information. In an embodiment, the security service data may also be stored in a local data repository 180 associated with the security gateway 170 for attestation and enrollment purposes. For example, when a generic device 125, 130 is ready for attestation and enrollment, the security gateway 170 may be configured to retrieve a device record that corresponds with the particular generic device 125, 130 from the blockchain 190 using the blockchain transactor instructions 520 and store the record in local data repository 180.

When a device 125, 130 is ready for attestation, the security gateway 170 may use attestation and enrollment service instructions 510 to issue an authentication challenge that requests that the device 125, 130 provide its device fingerprint. In response, the device 125, 130 may dynamically generate and provide the device fingerprint, which the security gateway 170 may authenticate by cross-referencing with the device fingerprint 240 data stored in the blockchain 190 or data repository 180.

Moreover, the security gateway 170 may also use the attestation and enrollment service instructions 510 to validate device authenticity using certificates. Specifically, each security gateway 170 that is deployed at the customer premise may have trust anchors or certificates that are signed by vendor certificate authorities for multiple vendors. When a generic device 125, 130 is ready for attestation and enrollment, the security gateway 170 may use attestation and enrollment service instructions 510 to issue an authentication challenge that requests that the device 125, 130 provide a vendor certificate. In response, the device 125, 130 may provide a vendor certificate, which the security gateway 170 validates using the vendor trust anchor.

The security gateway 170 may use the attestation and enrollment service instructions 510 to validate the device using the ownership information. For example, since the security gateway 170 is deployed at the customer or owner premise, the security gateway 170 can access the blockchain 190 storing the ownership information 310 for a particular device 125, 130 and cross-reference the ownership information 310 with the network that the security gateway 170 is deployed on. If the ownership information 310 matches, then the security gateway 170 may confirm that the device 125, 130 belongs to this particular owner and is properly being enrolled into the owner's network.

While the security gateway 170 authenticates the device, the device 125, 130 may also authenticate the security gateway 170 to ensure that the security of the gateway has not been compromised. Specifically, the device 125, 130 may issue an authentication challenge that requests that the security gateway 170 provide the device 125, 135 with the device's serial number. Since the serial number is hidden as a shared secret, the security gateway 170 may work in conjunction with one or more other security gateways 170 to decrypt two or more shares of the shared secret, access the hidden serial number, and provide the serial number to the device 125, 130.

Specifically, in response to the challenge from the device, the blockchain transactor 520 may request the security gateway's corresponding share from the blockchain 190. The security gateway 170 may then use decrypting instructions 530 to decrypt the encrypted share using this security gateway's private key. The security gateway 170 may also use secret unveil instructions 550 to send a participation request to any other available security gateways 170 to unveil or reveal the security service information. The participation of at least one other gateway may be sufficient to reveal the security service information. Availability of the other gateways 170 may be determined by which other gateways have internet access, in an example embodiment.

Once at least one other available gateway 170 receives a participation request from the requesting security gateway 170 and confirms its availability using the secret unveil instructions 550, the available gateway(s) 170 may execute their blockchain transactor instructions 520 to access their respective encrypted shares stored as data in the blockchain 190, use decrypting instructions 530 to decrypt their respective shares using their respective private keys, use encrypting instructions 540 to re-encrypt the shares using the public key of the requesting security gateway 170, and use secret unveil instructions 550 to send the re-encrypted shares to the requesting security gateway 170 in order to reveal the security service information.

Once the original requesting gateway 170 receives the re-encrypted shares, the gateway may use its own decrypting instructions 530 to decrypt the re-encrypted shares. Each of the shares may then be used in accordance with a secret sharing algorithm to reveal the secret. In an example embodiment, the secret may be the device serial number or fingerprint. The security gateway 170 may then use attestation and enrollment service instructions 510 to send the device serial number to the device 125, 130 for authentication.

In an embodiment, the device 125, 130 may also authenticate the security gateway 170 by issuing an authentication challenge that requests that the security gateway 170 decrypt a nonce using the gateway's private key. Specifically, since the gateway public key was embedded in each device 125, 130 at the time of manufacture, the device 125, 130 may use the gateway public key to encrypt a nonce and request that the security gateway 170 decrypt it. The security gateway 170 may then use decrypting instructions 530 to decrypt the nonce using its private key and send the decrypted nonce to the device 125, 130 for authentication.

In an embodiment, if both the device 125, 130 and the security gateway 170 are successfully authenticated, then the attestation and enrollment service instructions 510 may initiate enrollment of the device 125, 130 with a customer or owner's trusted private or public certificate authority 175. In an embodiment, if the security gateway 170 is unable to authenticate the device 125, 130, then the security gateway 170 may flag the device 125, 130 for review and refuse enrollment of the device. If the device 125, 130 is unable to authenticate the security gateway 170, then the device 125, 130 may refuse enrollment by the potentially compromised security gateway 170.

Figure 6:
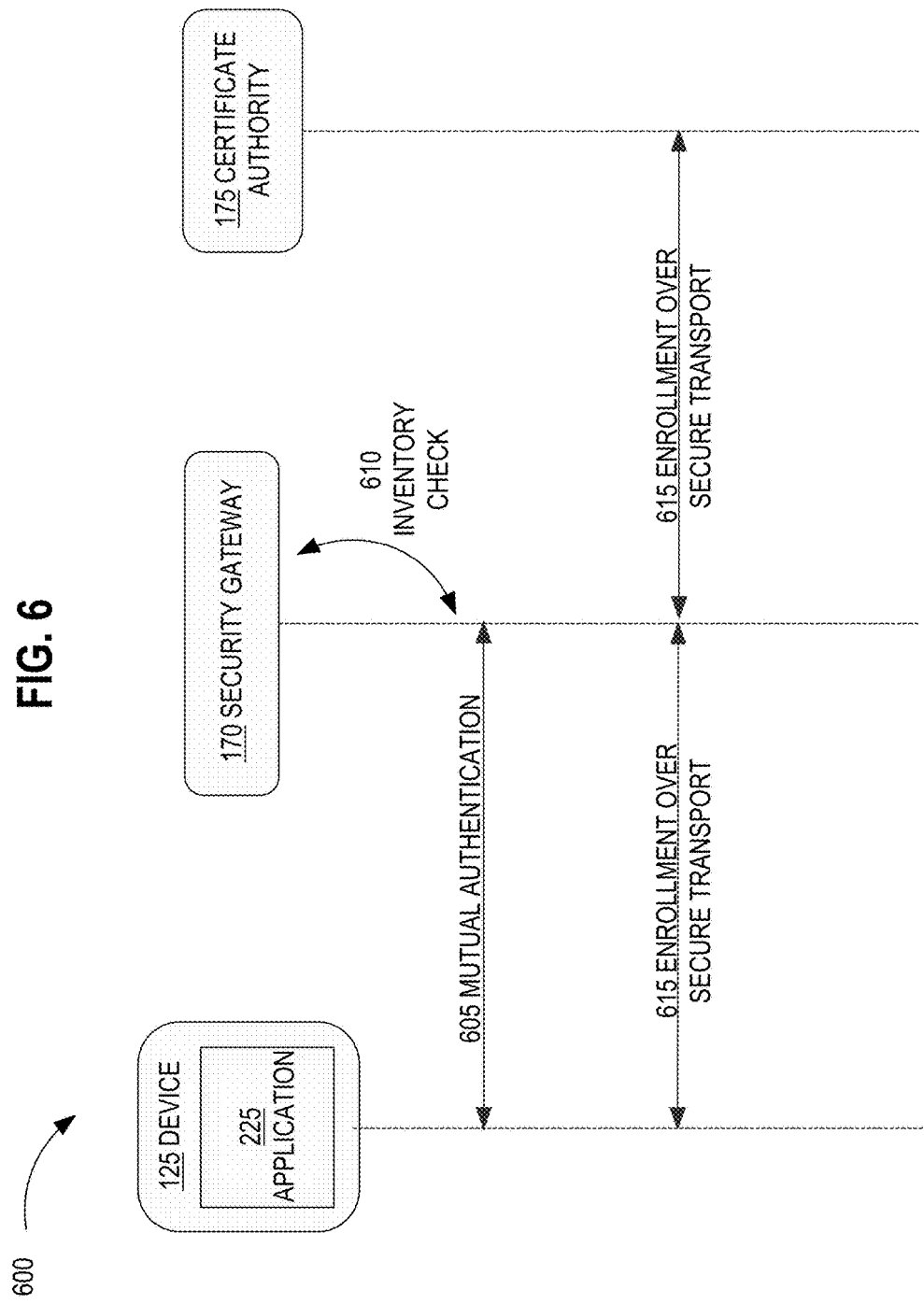
FIG. 6 illustrates a device message flow, in an example embodiment.

FIG. 6 illustrates a device message flow 600, in an example embodiment. At the time a device 125 is attested to the security gateway 170 and the device 125 engage in a process of mutual authentication 605, as described herein. The mutual authentication 605 may involve an inventory check 610 where the security gateway 170 cross-references security service data stored in the blockchain 190 and/or a local data repository 180 with data presented by the device 125.

As previously discussed herein, this attestation and enrollment technique may be applied not just to device, but to applications running on devices. In the example of FIG. 6, the attestation and enrollment may be applied not just to device 125, but to application 225 as well. This allows for the enrollment of different applications running on the same device.

If mutual authentication is successful and both the device 125 and the security gateway 170 are trusted, then the device 125 and/or application 225 may be enrolled into the customer or owner trust, or certificate authority 175, with device and application specific certificates. In an embodiment, enrollment may be conducted using the Enrollment over Secure Transport (EST) 615 protocol, although any protocol may be used. For example, in another embodiment, Simple Certificate Enrollment Protocol (SCEP) or any other protocol may be used.

3.3 Blockchain Operations

In other applications, a blockchain functions as a decentralized digital ledger that tracks numerous entries. Copies of the entire blockchain may be stored at each computer 185, or node, in a distributed network of interconnected computers of which FIG. 1 illustrates computer 185 with blockchain 190.

In an embodiment, proposed entries to the blockchain 190 may be checked by a majority of the computers for verification. For example, if the blockchain transactor instructions 450 of the security broker 105 attempts to generate a new entry in the blockchain 190, the network of interconnected computers that also store copies of the blockchain would first run algorithms to evaluate the hashes and verify the validity of the entry. If a majority of the computers agree that the entry is valid, then the entry will be added as a new block in the blockchain 190. As a part of a consensus network, blockchain 190 enforces high Practical Byzantine Fault Tolerance (PBFT) and other types of consensus algorithms; for example, a malicious attack attempting to alter the information in the blockchain 190 would need to control over 67% of the computers in the consensus network to alter the consensus. Since it would be exceedingly difficult to maliciously attack and maintain control over that many computers, the blockchain data is better protected against malicious attacks than traditional methods of data storage.

Figure 7:
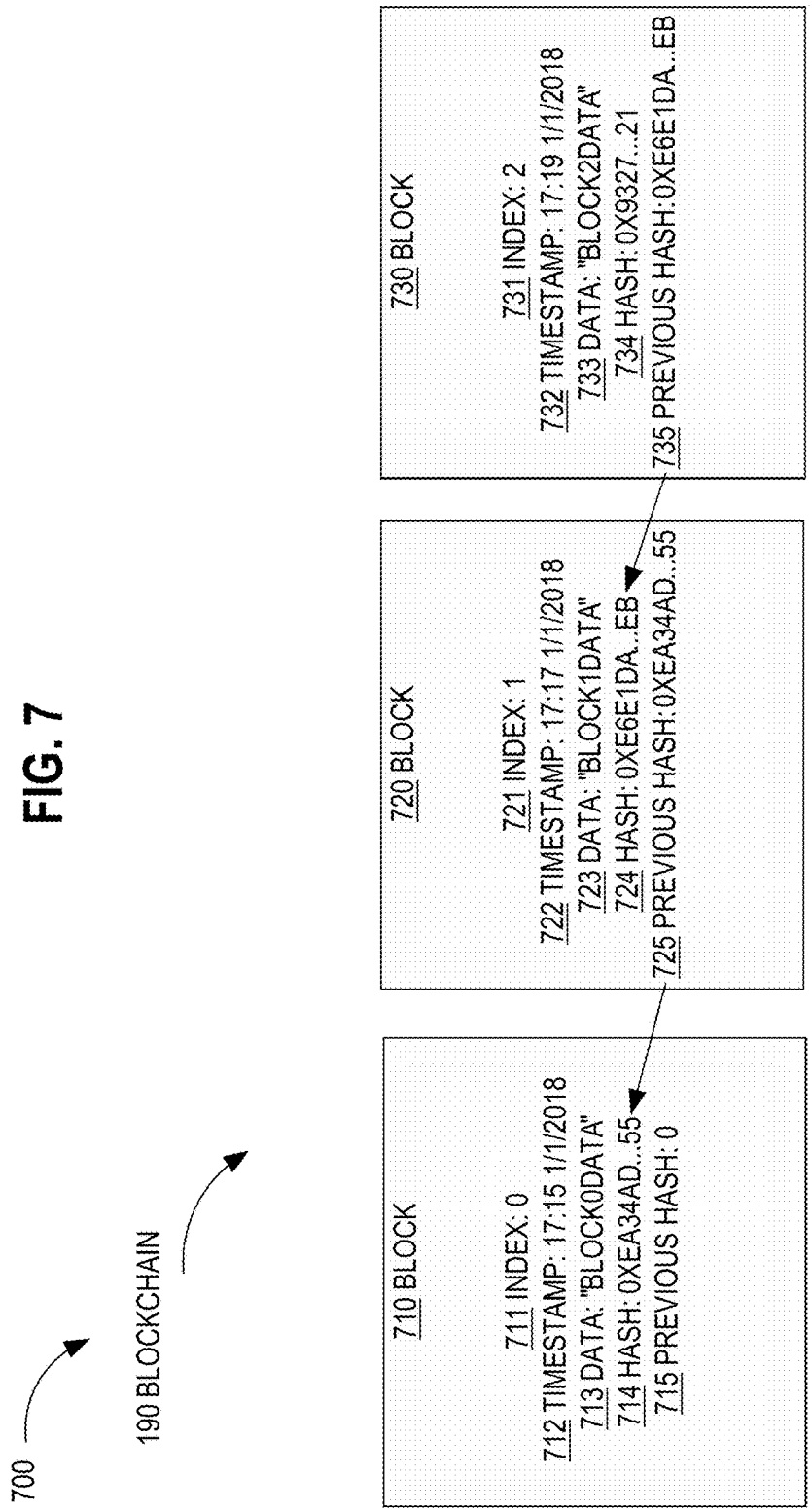
FIG. 7 illustrates a digital blockchain database, in an example embodiment.

FIG. 7 illustrates a digital blockchain database. In an example embodiment, a digital blockchain database 700 comprises a blockchain 190 having blocks 710, 720, 730. Blockchain 190 may include any number of blocks. In the example of FIG. 7, each block 710, 720, 730 may include its own index number 711, 721, 731, timestamp 712, 722, 732, data 713, 723, 733, hash 714, 724, 734, and previous hash 715, 725, 735.

The index number 711, 721, 731 may be a numerical index that indicates the block's placement in the chain. The timestamp 712, 722, 732 may be the date and time of when a block 710, 720, 730 is created. The data 713, 723, 733 may be an encrypted share stored as "block0data" "block1data", and "block2data" in the blocks 710, 720, 730, respectively. The hash 714, 724, 734 may be a hash of the encrypted share, such as an MD5 hash, SHA256 hash, or RIPEMD hash. The previous hash 715, 725, 735 may be the hash of the previous block, which links the blocks in sequence. In the example of FIG. 7, block 730 stores a record of previous hash 724, while block 720 stores a record of previous hash 714. These records of previous hashes link each new block to the previous block to form a chain that allows for integrity checks of each block.

4.0 Procedural Overview

Figure 8:
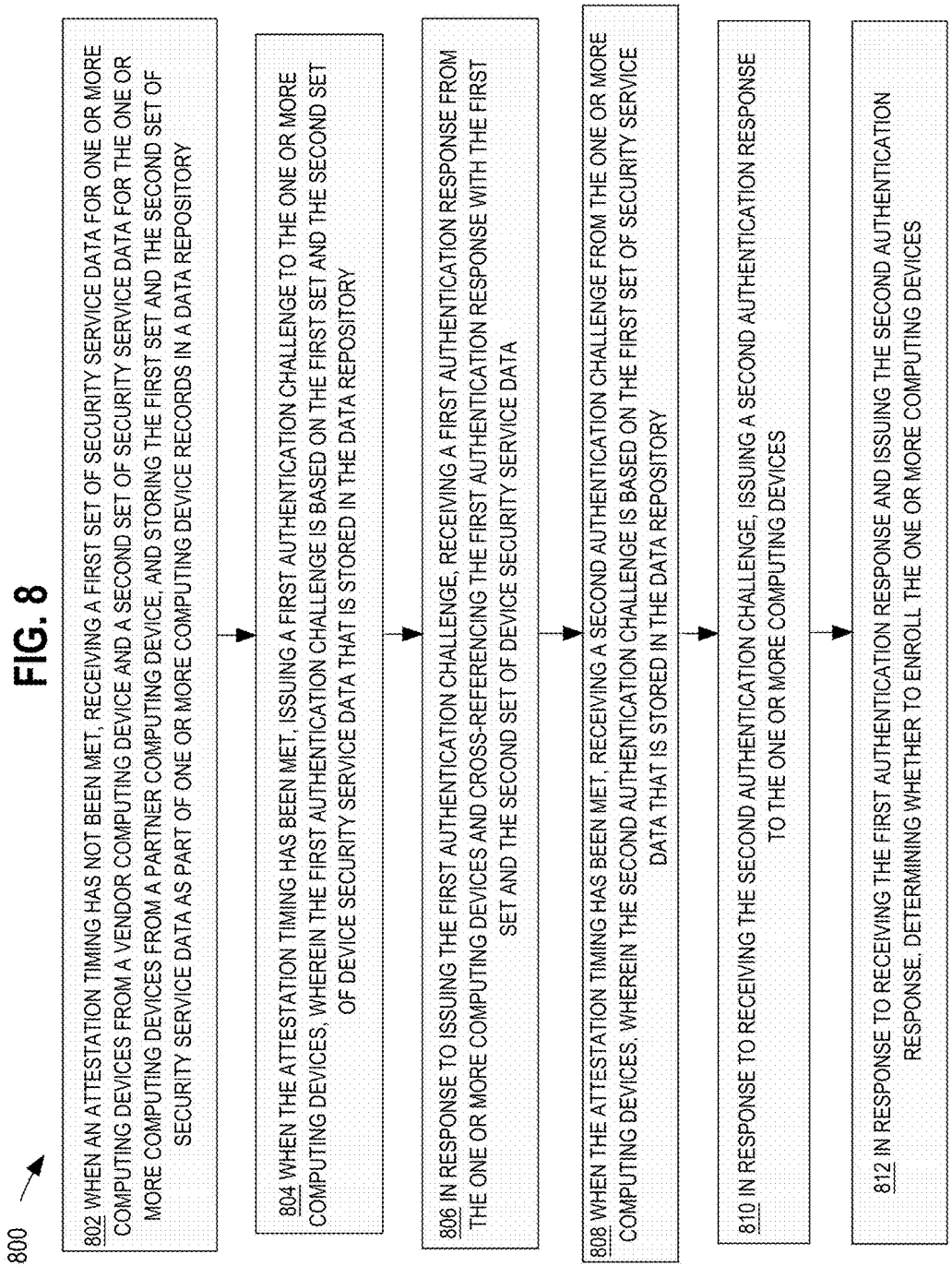
FIG. 8 illustrates an algorithm or method for generic device attestation and enrollment, in an example embodiment.

FIG. 8 illustrates a method or algorithm for generic device attestation and enrollment, in an example embodiment.

In one embodiment, a method 800 starts at step 802, when an attestation timing has not been met yet. This period of time may encompass any time prior to when a generic device 125, 130 is ready to be attested to and enrolled in a customer network. For example, this period may encompass a manufacturing time period while the device 125, 130 is being manufactured or a registration time period while the device 125, 130 is being prepared for distribution. During this period, the security broker 105 receives a first set of security service data pertaining to one or more devices 125, 130, such as industrial IoT devices, from a vendor computing device. The first set of security service data may be, for example, gateway public keys, vendor device specific keys, device fingerprints, signed device serial numbers hidden as shared secrets, or any other type of security data.

Before an attestation timing has been met, the security broker 105 may also receive a second set of security service data pertaining to one or more of the devices 125, 130 from a partner computing device. The second set of security service data may be, for example, ownership information obtained by a partner 155 who has confirmed sales or distribution of the devices 125, 130 to a particular customer or owner. When both the first set and second set of security service data have been received, the security broker 105 may store the security service data as part of one or more device records in a blockchain 190 data repository.

At step 804, the attestation timing has been met. For example, the generic devices 125, 130 have been received by the customer or owner and is now ready for on-boarding. At this stage, a local security gateway 170 may issue a first authentication challenge to the devices 125, 130 and/or applications 225, 230 running on the devices. The first authentication challenge is based on both the first and second set of device security service data that is stored in the blockchain 190. For example, the security gateway 170 may issue a challenge requesting the vendor certificates to prove authenticity and/or the device fingerprint to prove both ownership and authenticity.

At step 806, once the device fingerprint and/or vendor certificates are received, the security gateway 170 may check the received data against the security service data stored in the blockchain 190 and validate device authenticity using a vendor trust anchor. In an embodiment, once the fingerprint and/or certificates are received, the security gateway 170 may also confirm ownership of the device by cross-referencing the stored ownership information that corresponds to the fingerprint with the owner of the network to determine if the device 125, 130 is trying to join the correct network.

At step 808, the device 125, 130 may also authenticate the security gateway 170 when the attestation timing has been met. Specifically, the security gateway 170 may receive an authentication challenge from the device 125, 130 based on the first set of security services data. For example, the device requests that the gateway return the device's own serial number and/or requests that the gateway decrypt a nonce encrypted by the gateway's public key.

At step 810, since the serial number is a shared secret, the security gateway 170 would decrypt its own share of the shared secret, request participation from one or more other gateways to decrypt their own shares and re-encrypt them using the requesting gateway's public key, receive and decrypt the re-encrypted shares from the other gateways using the gateway's private key, and reveal the hidden serial number using the secret sharing algorithm. The security gateway 170 may subsequently send the serial number to the device 125, 130 for authentication. Where the gateway is asked to decrypt a nonce that has been encrypted using the gateway's public key, the security gateway 170 would prove authenticity by decrypting the nonce using its private key and sending the decrypted nonce to the device 125, 130 for authentication.

At step 812, the security gateway 170 determines whether to enroll the device 125, 130 based on the devices' response to the gateway's challenge, as well as the gateway's response to the device's challenge. If the security gateway 170 is unable to authenticate the device 125, 130, then the device will be denied enrollment and optionally flagged for review. If the device 125, 130 is unable to authenticate the security gateway 170, then the device may refuse enrollment and optionally flag the security gateway 170 for review. However, if both the device and the gateway are mutually authenticated, then the security gateway 170 may enroll the device 125, 130 into the customer trust where device-specific certificates are issued by a customer certificate authority 175.

In an embodiment, mutual authentication between the device 125, 130 and the security gateway 170 may occur when the gateway authenticates to the device and the device authenticates to the gateway. For example, in one embodiment, to authenticate the device 125, 130 at step 804, the security gateway 170 may send an authentication challenge to the device 125, 130 that asks for the device fingerprint. The device 125, 130 may generate the fingerprint based on Central Processing Unit (CPU) data, memory data, a Media Access Control (MAC) address, a BIOS checksum, a hard drive serial number, a seed, a time of manufacture and/or firmware data, and send the fingerprint to the security gateway 170. In response to receiving the fingerprint, the security gateway 170 may compare the received fingerprint with the device fingerprint 240 data stored in the blockchain 190 or data repository 180 to authenticate the device 125, 130. In another embodiment, the device 125, 130 may send vendor-specific certificates in response to a gateway's request for vendor-specific certificates. The security gateway 170 may then compare the received certificate to the data stored in blockchain 190 or data repository 180.

In one embodiment, to authenticate the security gateway 170 at step 808 and step 810, the device 125, 130 may encrypt a nonce using the gateway public key that is embedded in the device and send an authentication challenge to the security gateway 170. In response to receiving the encrypted nonce, the security gateway 170 may use the corresponding gateway private key to decrypt the nonce and send a response back to the device 125, 130 to prove authenticity of the gateway. If both the device and the gateway are mutually authenticated, then the security gateway 170 enrolls the device 125, 130 into the customer trust. In an embodiment, the security gateway 170 may initiate enrollment with the certificate authority 175 using Enrollment over Secure Transport (EST) protocol, Simple Certificate Enrollment Protocol (SCEP), or any other protocol may be used.

Using the foregoing techniques, programmed computers may use a distributed system to hide, transfer, store, and utilize sensitive data in a manner that maximizes data security and data integrity while improving data delivery and authentication techniques. Implementations provide for decreased use of network bandwidth and decreased use of processing resources for vendor computers that no longer provide device pre-configuration services for millions of devices. Specifically, by acquiring security service data during a manufacturing and registration period for generic, non-configured devices, a distributed system of security brokers, blockchains 190, and security gateways 170 offer an improved method of attestation and enrollment that results in less network traffic and less use of vendor processing resources.

Furthermore, the approaches disclosed herein improve data security and data integrity. The use of a blockchain 190 ensures that all changes to security service information are first approved by the consensus network, which protects the integrity of the blockchain data. The nature of the blockchain 190 also ensures that each new block of data is linked to the previous block, creating an improved method of documenting changes and rejecting unapproved changes. Consequently, the blockchain 190 functions as a secure backup for sensitive security service information with high Practical Byzantine Fault Tolerance (PBFT) and other types of consensus algorithms.

Improved data security is also provided by the techniques described herein through the various encryption methods. The use of secret sharing encryption ensures that the security service data is protected by splitting certain security service information into shares and encrypting those shares with public keys corresponding to different gateways. For a malicious attack to successfully obtain the security service information, the private keys of at least three gateways 170 would be needed. Since it is less likely a malicious attack could obtain the private keys of three separate gateways 170, the secret sharing encryption improves the security of the data.

4.0 Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 9:
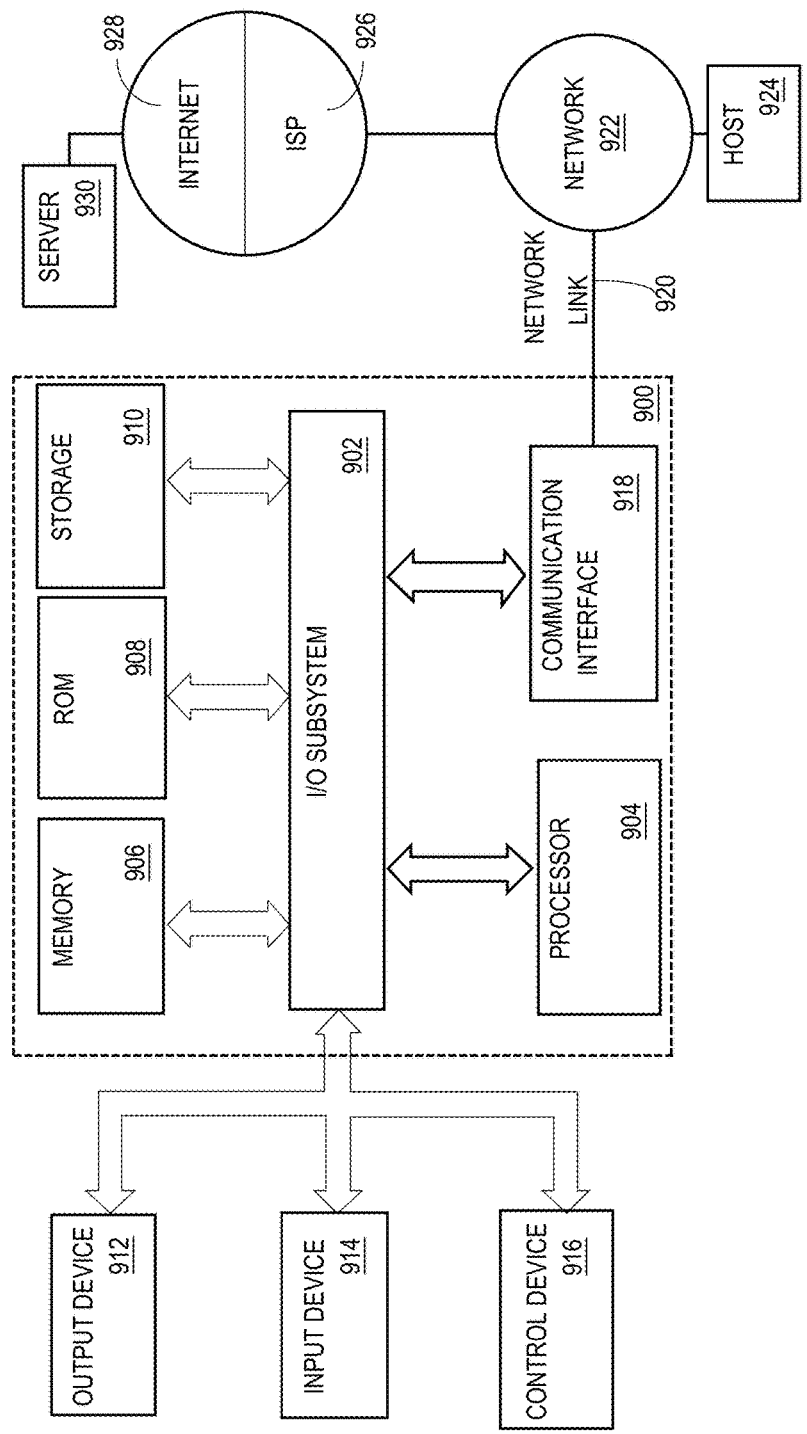
FIG. 9 illustrates a computer system upon which an embodiment of the invention may be implemented.

FIG. 9 is a block diagram that illustrates an example computer system with which an embodiment may be implemented. In the example of FIG. 9, a computer system 900 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 900 includes an input/output (I/O) subsystem 902 which may include a bus and/or other communication mechanism(s) for communicating information and/or instructions between the components of the computer system 900 over electronic signal paths. The I/O subsystem 902 may include an I/O controller, a memory controller and at least one I/O port. The electronic signal paths are represented schematically in the drawings, for example as lines, unidirectional arrows, or bidirectional arrows.

At least one hardware processor 904 is coupled to I/O subsystem 902 for processing information and instructions. Hardware processor 904 may include, for example, a general-purpose microprocessor or microcontroller and/or a special-purpose microprocessor such as an embedded system or a graphics processing unit (GPU) or a digital signal processor or ARM processor. Processor 904 may comprise an integrated arithmetic logic unit (ALU) or may be coupled to a separate ALU.

Computer system 900 includes one or more units of memory 906, such as a main memory, which is coupled to I/O subsystem 902 for electronically digitally storing data and instructions to be executed by processor 904. Memory 906 may include volatile memory such as various forms of random-access memory (RAM) or other dynamic storage device. Memory 906 also may be used for storing temporary variables or other intermediate information during execution of instructions to be executed by processor 904. Such instructions, when stored in non-transitory computer-readable storage media accessible to processor 904, can render computer system 900 into a special-purpose machine that is customized to perform the operations specified in the instructions.

Computer system 900 further includes non-volatile memory such as read only memory (ROM) 908 or other static storage device coupled to I/O subsystem 902 for storing information and instructions for processor 904. The ROM 908 may include various forms of programmable ROM (PROM) such as erasable PROM (EPROM) or electrically erasable PROM (EEPROM). A unit of persistent storage 910 may include various forms of non-volatile RAM (NVRAM), such as FLASH memory, or solid-state storage, magnetic disk or optical disk such as CD-ROM or DVD-ROM and may be coupled to I/O subsystem 902 for storing information and instructions. Storage 910 is an example of a non-transitory computer-readable medium that may be used to store instructions and data which when executed by the processor 904 cause performing computer-implemented methods to execute the techniques herein.

The instructions in memory 906, ROM 908 or storage 910 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 900 may be coupled via I/O subsystem 902 to at least one output device 912. In one embodiment, output device 912 is a digital computer display. Examples of a display that may be used in various embodiments include a touch screen display or a light-emitting diode (LED) display or a liquid crystal display (LCD) or an e-paper display. Computer system 900 may include other type(s) of output devices 912, alternatively or in addition to a display device. Examples of other output devices 912 include printers, ticket printers, plotters, projectors, sound cards or video cards, speakers, buzzers or piezoelectric devices or other audible devices, lamps or LED or LCD indicators, haptic devices, actuators or servos.

At least one input device 914 is coupled to I/O subsystem 902 for communicating signals, data, command selections or gestures to processor 904. Examples of input devices 914 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 916, which may perform cursor control or other automated control functions such as navigation in a graphical interface on a display screen, alternatively or in addition to input functions. Control device 916 may be a touchpad, a mouse, a trackball, or cursor direction keys for communicating direction information and command selections to processor 904 and for controlling cursor movement on display 912. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 914 may include a combination of multiple different input devices, such as a video camera and a depth sensor.

In another embodiment, computer system 900 may comprise an internet of things (IoT) device in which one or more of the output device 912, input device 914, and control device 916 are omitted. Or, in such an embodiment, the input device 914 may comprise one or more cameras, motion detectors, thermometers, microphones, seismic detectors, other sensors or detectors, measurement devices or encoders and the output device 912 may comprise a special-purpose display such as a single-line LED or LCD display, one or more indicators, a display panel, a meter, a valve, a solenoid, an actuator or a servo.

When computer system 900 is a mobile computing device, input device 914 may comprise a global positioning system (GPS) receiver coupled to a GPS module that is capable of triangulating to a plurality of GPS satellites, determining and generating geo-location or position data such as latitude-longitude values for a geophysical location of the computer system 900. Output device 912 may include hardware, software, firmware and interfaces for generating position reporting packets, notifications, pulse or heartbeat signals, or other recurring data transmissions that specify a position of the computer system 900, alone or in combination with other application-specific data, directed toward host 924 or server 930.

Computer system 900 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 900 in response to processor 904 executing at least one sequence of at least one instruction contained in main memory 906. Such instructions may be read into main memory 906 from another storage medium, such as storage 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 910. Volatile media includes dynamic memory, such as memory 906. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 902. Transmission media can also take the form of acoustic or light waves, such as those generated during radio-wave and infra-red data communications.

Various forms of media may be involved in carrying at least one sequence of at least one instruction to processor 904 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 900 can receive the data on the communication link and convert the data to a format that can be read by computer system 900. For instance, a receiver such as a radio frequency antenna or an infrared detector can receive the data carried in a wireless or optical signal and appropriate circuitry can provide the data to I/O subsystem 902 such as place the data on a bus. I/O subsystem 902 carries the data to memory 906, from which processor 904 retrieves and executes the instructions. The instructions received by memory 906 may optionally be stored on storage 910 either before or after execution by processor 904.

Computer system 900 also includes a communication interface 918 coupled to bus 902. Communication interface 918 provides a two-way data communication coupling to network link(s) 920 that are directly or indirectly connected to at least one communication networks, such as a network 922 or a public or private cloud on the Internet. For example, communication interface 918 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 922 broadly represents a local area network (LAN), wide-area network (WAN), campus network, internetwork or any combination thereof. Communication interface 918 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 918 sends and receives electrical, electromagnetic or optical signals over signal paths that carry digital data streams representing various types of information.

Network link 920 typically provides electrical, electromagnetic, or optical data communication directly or through at least one network to other data devices, using, for example, satellite, cellular, Wi-Fi, or BLUETOOTH technology. For example, network link 920 may provide a connection through a network 922 to a host computer 924.

Furthermore, network link 920 may provide a connection through network 922 or to other computing devices via internetworking devices and/or computers that are operated by an Internet Service Provider (ISP) 926. ISP 926 provides data communication services through a world-wide packet data communication network represented as internet 928. A server computer 930 may be coupled to internet 928. Server 930 broadly represents any computer, data center, virtual machine or virtual computing instance with or without a hypervisor, or computer executing a containerized program system such as DOCKER or KUBERNETES. Server 930 may represent an electronic digital service that is implemented using more than one computer or instance and that is accessed and used by transmitting web services requests, uniform resource locator (URL) strings with parameters in HTTP payloads, API calls, app services calls, or other service calls. Computer system 900 and server 930 may form elements of a distributed computing system that includes other computers, a processing cluster, server farm or other organization of computers that cooperate to perform tasks or execute applications or services. Server 930 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 930 may comprise a web application server that hosts a presentation layer, application layer and data storage layer such as a relational database system using structured query language (SQL) or no SQL, an object store, a graph database, a flat file system or other data storage.

Computer system 900 can send messages and receive data and instructions, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage 910, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 904. While each processor 904 or core of the processor executes a single task at a time, computer system 900 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method providing improvements in secure enrollment of computing devices in networks that use an attestation process to validate device identity, comprising:

receiving a first set of security service data and a second set of security service data for one or more Internet of Things (IoT) computing devices respectively from a vendor computing device and a partner computing device, the second set of security data comprising ownership information for the one or more IoT computing devices, and storing the first set and the second set of security service data as part of one or more IoT computing device records in a distributed blockchain data repository when an attestation timing has not been met;

when the attestation timing has been met, issuing by a security gateway device a first authentication challenge to the one or more IoT computing devices, wherein the first authentication challenge is based on the first set and the second set of device security service data;

in response to issuing the first authentication challenge, receiving a first authentication response from the one or more IoT computing devices and cross-referencing the first authentication response with the first set and the second set of device security service data;

when the attestation timing has been met, receiving a second authentication challenge from the one or more IoT computing devices, wherein the second authentication challenge is based on the first set of security service data;

in response to receiving the second authentication challenge, issuing a second authentication response to the one or more IoT computing devices; and in response to both of receiving the first authentication response and issuing the second authentication response from and to the one or more IoT computing devices respectively, determining by the security gateway device with the attestation process whether to enroll the one or more IoT computing devices to the networks.

2. The computer-implemented method of claim 1, wherein the first set of security service data comprises a shared secret, a gateway public key, or a device fingerprint.

3. The computer-implemented method of claim 2, wherein the device fingerprint is generated based, at least in part, on two or more of: Central Processing Unit (CPU) data, memory data, a Media Access Control (MAC) address, a BIOS checksum, a hard drive serial number, a seed, firmware data, and a time of manufacture.

4. The computer-implemented method of claim 2, wherein the device fingerprint was dynamically generated by the one or more computing devices.

5. The computer-implemented method of claim 2, wherein the shared secret is based on a signed device serial number.

6. The computer-implemented method of claim 1, wherein the second set of security service data comprises ownership data.

7. The computer-implemented method of claim 1, further comprising:
   in response to determining whether to enroll the one or more computing devices, enrolling the one or more computing devices into an owner network using Enrollment of Secure Transport (EST) protocol.

8. One or more non-transitory computer-readable storage media storing one or more instructions programmed for providing improvements in secure enrollment of computing devices in networks that use an attestation process to validate device identity and which, when executed by one or more intermediary computing devices, cause:
   receiving a first set of security service data and a second set of security service data for one or more Internet of Things (IoT) computing devices respectively from a vendor computing device and a partner computing device, the second set of security data comprising ownership information for the one or more IoT computing devices, and storing the first set and the second set of security service data as part of one or more IoT computing device records in a distributed blockchain data repository when an attestation timing has not been met;

when the attestation timing has been met, issuing by a security gateway device a first authentication challenge to the one or more IoT computing devices, wherein the first authentication challenge is based on the first set and the second set of device security service data;

in response to issuing the first authentication challenge, receiving a first authentication response from the one or more IoT computing devices and cross-referencing the first authentication response with the first set and the second set of device security service data;

when the attestation timing has been met, receiving a second authentication challenge from the one or more IoT computing devices, wherein the second authentication challenge is based on the first set of security service data;

in response to receiving the second authentication challenge, issuing a second authentication response to the one or more IoT computing devices; and in response to both of receiving the first authentication response and issuing the second authentication response from and to the one or more IoT computing devices respectively, determining by the security gateway device with the attestation process whether to enroll the one or more IoT computing devices to the networks.

9. The one or more non-transitory computer-readable storage media of claim 8, wherein the first set of security service data comprises a shared secret, a gateway public key, or a device fingerprint.

10. The one or more non-transitory computer-readable storage media of claim 9, wherein the device fingerprint is generated based, at least in part, on two or more of: Central Processing Unit (CPU) data, memory data, a Media Access Control (MAC) address, a BIOS checksum, a hard drive serial number, a seed, firmware data, and a time of manufacture.

11. The one or more non-transitory computer-readable storage media of claim 9, wherein the device fingerprint was dynamically generated by the one or more computing devices.

12. The one or more non-transitory computer-readable storage media of claim 9, wherein the shared secret is based on a signed device serial number.

13. The one or more non-transitory computer-readable storage media of claim 9 storing one or more further instructions which, when executed by the one or more intermediary computing devices, further cause:
   in response to determining whether to enroll the one or more computing devices, enrolling the one or more computing devices into an owner network using Enrollment of Secure Transport (EST) protocol.

14. The one or more non-transitory computer-readable storage media of claim 8, wherein the second set of security service data comprises ownership data.

15. A computer system providing improvements in secure enrollment of computing devices in networks that use an attestation process to validate device identity, the system comprising:
   a distributed blockchain data repository;
   a broker computing device that is communicatively coupled to the distributed blockchain data repository and comprising a first non-transitory data storage medium storing a first set of instructions which, when executed by the broker computing device, cause:
      receiving a first set of security service data and a second set of security service data for one or more Internet of Things (IoT) computing devices respectively from a vendor computing device and a partner computing device, the second set of security data comprising ownership information for the one or more IoT computing devices, and storing the first set and the second set of security service data as part of one or more IoT computing device records in the distributed blockchain data repository when an attestation timing has not been met;

a gateway computing device that is communicatively coupled to the disturbed blockchain data repository and comprising a second non-transitory data storage medium storing a second set of instructions which, when executed by the gateway computing device, cause:

when the attestation timing has been met, issuing by a security gateway device a first authentication challenge to the one or more IoT computing devices, wherein the first authentication challenge is based on the first set and the second set of device security service data;

in response to issuing the first authentication challenge, receiving a first authentication response from the one or more IoT computing devices and cross-referencing the first authentication response with the first set and the second set of device security service data;

when the attestation timing has been met, receiving a second authentication challenge from the one or more IoT computing devices, wherein the second authentication challenge is based on the first set of security service data;

in response to receiving the second authentication challenge, issuing a second authentication response to the one or more IoT computing devices; and in response to both of receiving the first authentication response and issuing the second authentication response from and to the one or more IoT computing devices respectively, determining by the security gateway device with the attestation process whether to enroll the one or more IoT computing devices to the networks.

16. The computer system of claim 15, wherein the first set of security service data comprises a shared secret, a gateway public key, or a device fingerprint.

17. The computer system of claim 16, wherein the device fingerprint is generated based, at least in part, on two or more of: Central Processing Unit (CPU) data, memory data, a Media Access Control (MAC) address, a BIOS checksum, a hard drive serial number, a seed, firmware data, and a time of manufacture.

18. The computer system of claim 16, wherein the device fingerprint was dynamically generated by the one or more computing devices.

19. The computer system of claim 16, wherein the shared secret is based on a signed device serial number.

20. The computer system of claim 15, wherein the second set of security service data comprises ownership data.

* * * * *